July 23, 1968  KENICHI YAMAMOTO ET AL  3,393,666
ROTARY PISTON INTERNAL COMBUSTION ENGINE
Filed April 29, 1966

INVENTORS
KENICHI YAMAMOTO
SEIJIRO TSUNO

BY *Wenderth, Lind & Ponack*

ATTORNEYS

United States Patent Office 3,393,666
Patented July 23, 1968

---

3,393,666
ROTARY PISTON INTERNAL COMBUSTION ENGINE
Kenichi Yamamoto and Seijiro Tsuno, Hiroshima-shi, Japan, assignors to Toyo Kogyo Company Limited, Hiroshima-ken, Japan
Filed Apr. 29, 1966, Ser. No. 546,269
Claims priority, application Japan, May 6, 1965, 40/35,644; May 24, 1965, 40/41,520
12 Claims. (Cl. 123—8)

ABSTRACT OF THE DISCLOSURE

A rotary piston internal combustion engine having recessed hollows opening out of the internally facing wall of a housing which has two or more lobed cavities within which a three or more side rotary piston rotates with planetary rotation, thereby permitting the fuel products at the rear corner of the working chamber to pass through the said recessed hollows into the next following chamber under the effect of the pressure differential between adjacent chambers.

---

The present invention relates to a rotary piston internal combustion engine, and in particular to such an engine having as a part thereof means for reconditioning excessively rich combustible gas-mixture and accumulated fuel at the rear corner of the working chamber.

The average rotary piston internal combustion engine in which power output is produced by rotation of a rotary piston within a housing, comprises a housing structure having axially-spaced end walls and a peripheral wall interconnecting the end walls to form a cavity therebetween, and a triangular or other shaped multi-sided rotary piston rotatably mounted in the said cavity and coaxially journaled with and on an eccentirc portion of a shaft which extends axially through the center of the cavity and coaxially journaled in the housing in the housing end walls to produce planetary motion of the rotary piston during rotation of the shaft. The peripheral wall has an epitrochoidal-shaped inner surface and has at least two circumferentially spaced lobes.

The rotary piston has a peripheral surface with a plurality of circumferentially spaced apex portions and opposite flat end faces. Each of the said apexes is provided with a radially outwardly extending apex seal for sealing engagement with the epitrochoidal inner surface of the peripheral wall. There is thus defined between the housing and the rotary piston a plurality of working chambers which vary in volume during the planetary motion of the rotary piston. The opposite flat end faces of the piston also have side seal and corner seal members cooperating with each other to provide a fluid tight seal between the end walls and piston end faces. Intake, exhaust ports and spark producing means are appropriately spaced and positioned around the peripheral wall and, when special structure requires it, can be positioned in the end walls of the housing. During the planetary motion of the rotary piston, during which each working chamber varies in volume, the cycle comprising intake, compression, power and exhaust strokes is performed.

In a combustion engine of this type, high gas velocity, especially during the early stages of the intake stroke, causes considerable turbulence and vortex flow of the fuel-gas mixture and causes a violent collision of the mixture with the inside surface of the peripheral wall defining the intake chamber, and the fuel, such as gasoline, separates from the mixture and forms an excessive oil film-like deposit on the said inner surface. During the rotation of the piston this deposit is scraped up or wiped up by the piston sealing members which are in sealing engagement with the said inner surface and slide thereon.

The disadvantage of the engine of this type is that the scraped up deposit accumulates in front of the seal members during the compression stroke and since the said accumulated product is exposed to the fuel-gas mixture in the compression chamber, the compression stroke is accompanied by re-dissolution of the accumulated product in the fuel-gas mixture. This destroys the uniform richness of the mixture; that is, the mixture around the accumulated deposit at the rear or trailing corner of the compression chamber is richer than that in the remainder of the compression chamber. This hampers instantaneous perfect combustion during the next succeeding combustion stroke considerably because development of fuel-gas combustion during the ignition is retarded at the richer mixture area. The deterioration of the engine performance with respect to the power and fuel consumption of this type of engine in which the stroke cycle is carried out at a very high speed is thus inevitable, and the exhaust contains a good deal of fuel which has not been completely burned.

An object of the present invention is to provide a rotary piston internal combustion engine in which the said accumulated deposit and the richer mixture are withdrawn from the compression chamber by the effect of the working pressure differential between two adjacent working chambers. In practice the deposit is drawn from the combustion or compression chamber to the trailing compression or intake chamber and reconditioned therein for the next following stroke cycle.

Other objects of the invention will become apparent from the following description taken in connection with the accompanying drawing in which.

Figure 1:
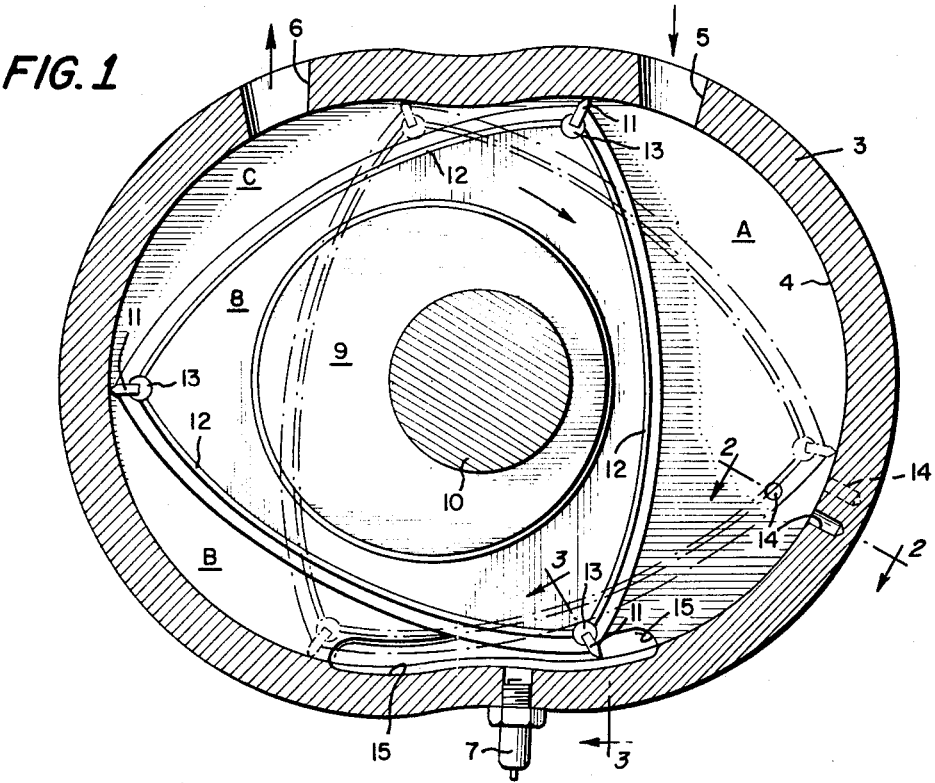
FIG. 1 is a transverse sectional elevation of a rotary piston internal combustion engine in accordance with the present invention.

Referring to the drawings, the housing of the rotary piston internal combustion engine comprises spaced end walls 1 and 2, and a peripheral center wall 3 disposed between the end walls to form a cavity therebetween and having an epitrochoidal inner surface 4 and appropriately circumferentially spaced intake and exhaust ports 5 and 6 and a spark plug 7 thereon.

Eccentrically positioned within the housing is a rotary piston 8 which is operatively and coaxially journaled for planetary motion on an eccentric portion 9 of a crankshaft 10 which extends axially through the center of the housing. Said piston 8 has substantially flat faces at the opposite ends thereof and positioned around the external periphery of the piston are at least three circumferentially spaced apexes. Three working chambers A, B and C, are defined between the rotary piston and the housing, which chambers cyclically vary in volume during planetary motion of the rotary piston 8 for the performance of series of intake, compression, expansion and exhaust strokes.

Each apex of the piston has an apex seal member 11 positioned within an axial groove and extending therein from one end face to the other of the piston 8 for sealing engagement with the inner surface of the peripheral wall 4. Opposite flat end faces of the piston have side and corner sealing members 12 and 13 for sealing engagement, together with the apex sealing members, with the inner surface of the end walls for sealing off the working chambers from each other.

Positioned between the intake port 5 and spark plug 7 on the inner surface of the housing 3 and the end walls 1 and 2 are recessed hollows or chambers 14 and 15 which open to the working chamber and which forming spaces sheltered from the scraping action performed by the seal members 11, 12 and 13 during rotation of the piston 8. These hollows or chambers 14 and 15 are disposed and adapted to draw the fuel accumulation and the richer and/or imperfectly burned mixture into a trailing chamber under the effect of the pressure difference between adjacent chambers as hereinafter described.

Fuel which is separated from the fuel-gas mixture because of the fuel-gas mixture turbulence and vortex flow during the intake stroke and deposited on the inner surface of the housing 3 is scraped up during the rotation of the rotary piston by the piston sealing members 11, 12 and 13, and during the compression stroke the scraped up deposit is accumulated in front of the moving sealing members especially at the rear or trailing corner portion of the compression chamber. As illustrated in FIG. 1, positioned between the intake port 5 and spark plug 7 and opening to the working chamber are recessed hollows 14, which are adapted to permit the accumulated deposit which is scraped to the positions thereof by the moving sealing members, to fall into them under the effect of the working pressure. The deposits in the hollows 14 remain therein until the rear or trailing corner sealing member passes over the hollows 14. After the passage of the said rear or trailing corner sealing member over the hollow 14, the scraped-up accumulation within the hollows is drawn therefrom under the effect of the pressure differential between each adjacent compression and intake chambers, and is dispersed in the turbulence and vortex flow of the fuel-gas mixture in the trailing intake chamber. The scraped-up accumulation is thus reconditioned and mixed with the mixture during the intake stroke and supplied together with the fresh gas to the next following stroke.

It is preferred to position the hollows 14 such that, as illustrated in FIG. 1, the rear or trailing sealing members of the compression chamber pass over those openings at or just before the firing so that the scraped-up accumulation carried to the combustion stroke is reduced as far as possible. Similar results will be obtained by providing hollows 14 upon only the inner surface of the peripheral wall or in the inner surface of the end walls.

Extending circumferentially along the inner surface of the housing adjacent the spark plug are recessed hollows 15 through which the remaining scraped-up accumulation and the richer fuel-gas mixture are passed back and returned to the next succeeding strokes as hereinafter described. Upon firing, which in this type of engine will occur just before the compression stroke reaches maximum compression, the combustion stroke and then the expansion stroke takes place. During those strokes the remaining scraped-up accumulation and the richer fuel-gas mixture resulting from the redispersion of the scraped-up accumulation in the mixture and which is carried over from the previous intake and compression strokes is present at the rear corner of the working chamber and hampers the perfect instantaneous burning of the gas mixture. However, during the rotation of the rotary piston and the advancing of the rear or trailing corner of the combustion chamber, the sealing members 11 pass over the recessed hollows 15, the remaining accumulation and the richer mixture present at the rear corner of the working chamber at the combustion or immediately succeeding expansion stroke has the combustion pressure applied thereto, and they are forced back through the recessed hollows 15 and drawn into the trailing chamber which is in the intake or compression stroke. The withdrawal just described will continue until the sealing members 11 pass beyond the hollows 15. The withdrawn products are mixed again with the mixture in the following chamber which is in the intake or compression stroke. Imperfectly burned gas resulting from the action of the rotational shifting and expansion of the crescent shaped combustion chamber B after the ignition, and remaining at the rear or trailing corner of the combustion chamber, is likewise forced back and withdrawn through the said recessed hollows 15 into the trailing chamber and likewise mixed with the gases therein.

The positioning, number and cross-sectional size and length of the recessed hollows 15 should be such as to provide rapid and sufficient flow back of only the remaining scraped-up accumulation and richer and/or imperfectly burned mixture of gases, but not back firing into the adjacent following chamber. The provision of those hollows 15 can also be either only on the inner surface of the peripheral wall 3 or on the inner surfaces of the end walls or, as shown in the accompanying drawing, on both peripheral wall and end walls. Each of these alternative forms results in similar withdrawal of the accumulation and richer and/or imperfectly burned mixture of gases.

Figure 2:
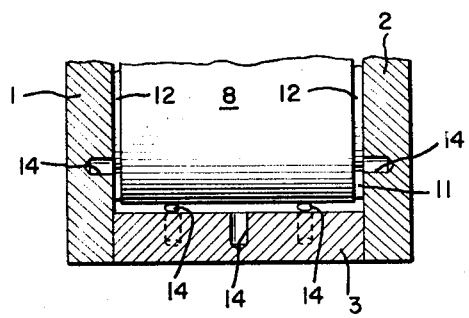
FIG. 2 is a fragmentary sectional view taken along the line 2—2 of FIG. 1.
Figure 3:
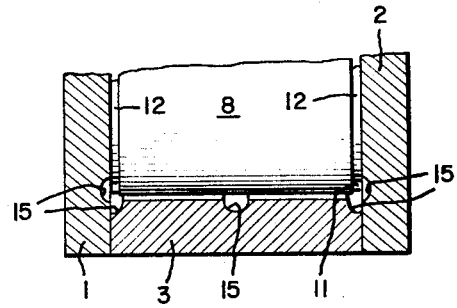
FIG. 3 is a fragmentary sectional view taken along the line 3—3 of FIG. 1.
Figure 4:
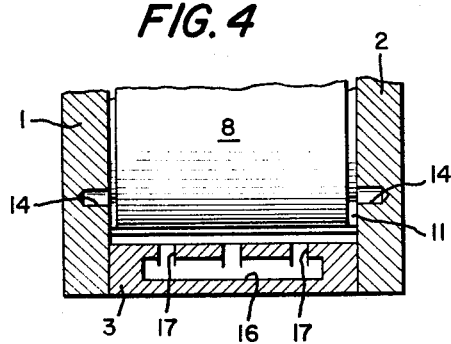
FIG. 4 is a cross sectional view similar to that of FIG. 2 showing an alternative form of recessed hollow or chamber in the inner surface of the peripheral wall in accordance with the invention.

In case of a specific type of such an engine requires that a larger volume of the scraped-up accumulation be withdrawn, the housing can be provided, as illustrated in FIG. 4, with a larger volume hollow or chamber 16 connected to the intake chamber through a plurality of holes 17. Withdrawal of scraped-up accumulation into and its ejection out of the chamber 16 through holes 17 is carried out in a manner similar to that described in connection with FIGS. 1 and 2.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

What is claimed is:

1. A rotary piston internal combustion engine comprising a housing having spaced end walls and a peripheral wall between said end walls and having an epitrochoidal inner surface forming a cavity, said housing having circumferentially spaced intake and exhaust ports and a spark plug extending through said housing at a point spaced therearound from said ports; a rotary piston having at least three sides and eccentrically rotatably mounted within the said cavity; said rotary piston having circumferentially spaced apexes and substantially flat end faces at opposite ends thereof; each of the said apexes and flat end faces having an elongated sealing member extending therefrom an engaging inner surface of the housing to form between the rotary piston and housing a plurality of working chambers in which are produced varying pressures during the planetary motion of the rotary piston; the inner surface of at least one of said walls having a plurality of recessed hollows therein which are in addition to said ports and the opening through which the spark plug extends, said recessed hollows opening into said chamber for permitting efficient and full withdrawal of the fuel product gathered in the rear corner zone of a leading working chamber to a trailing chamber to permit re-mixing of the withdrawn product in the trailing chamber for improving efficient fuel consumption.

2. A rotary piston internal combustion engine as claimed in claim 1 in which there are a plurality of recessed hollows and they are only in said end walls.

3. A rotary piston internal combustion engine as claimed in claim 1 in which there are a plurality of recessed hollows and they are in said peripheral wall and in said end walls.

4. A rotary piston internal combustion engine as claimed in claim 1 in which said recessed hollows are positioned at the point just before the compression stroke ends so that withdrawal of the product takes place just before the compression stroke ends so as to minimize the amount of fuel product gathered in the rear corner zone of the working chamber and subjected to the combustion stroke.

5. A rotary piston internal combustion engine as claimed in claim 1 in which there is at least a pair of said recessed hollows, one of which is positioned adjacent the spark plug and extends circumferentially for permitting the fuel product present in the rear corner of the working chamber to pass therethrough to the next following working chamber, and the other of which is positioned behind the one recess in the direction of rotation of the piston for minimizing the scraped deposit in front of the seal members before the combustion stroke takes place by admitting the said deposit into the said other recess when the seal members pass over the said other recess 6. A rotary piston internal combustion engine comprising a housing having spaced end walls and a peripheral wall between said end walls and having an epitrochoidal inner surface forming a cavity, said housing having circumferentially spaced intake and exhaust ports and a spark plug extending through said housing at a point spaced therearound from said ports; a rotary piston having at least three sides and eccentrically rotatably mounted within the said cavity; said rotary piston having circumferentially spaced apexes and substantially flat end faces at opposite ends thereof; each of the said apexes and flat end faces having an elongated sealing member extending therefrom an engaging inner surface of the housing to form between the rotary piston and housing a plurality of working chambers in which are produced varying pressures during the planetary motion of the rotary piston; the inner surface of at least one of said walls having at least one recessed hollow therein which is in addition to said ports and the opening through which the spark plug extends, said recessed hollow opening into said working chamber, said recessed hollow being positioned adjacent the spark plug and extending circumferentially for permitting the fuel product present in the rear corner of the working chamber which is the combustion and expansion chamber to pass therethrough to the next following working chamber by the effect of the pressure differential between the said two working chambers.

7. A rotary piston internal combustion engine as claimed in claim 6 in which said recessed hollow extends circumferentially into the working chamber which is the combustion and expansion chamber within a range so that the working chamber trailing corner sealing members pass over the said circumferential hollow before the back-firing from the combustion and expansion chamber to the next following chamber takes place.

8. A rotary piston internal combustion engine as claimed in claim 6 in which the said circumferential hollow extends circumferentially sufficiently far so that the said fuel product present in the rear corner of the said working chamber begins to pass therethrough to the trailing chamber just before the trailing chamber terminates the intake stroke.

9. A rotary piston internal combustion engine as claimed in claim 6 in which there are a plurality of said circumferential hollows and they are in said peripheral wall and in said end walls.

10. A rotary piston internal combustion engine as claimed in claim 6 in which the said circumferential hollow is only in said peripheral wall.

11. A rotary piston internal combustion engine as claimed in claim 10 in which there are a plurality of said circumferential hollows and they open along the peripheral wall at the opposite end corners of said sealing members and in the intermediate portion therebetween.

12. A rotary piston internal combustion engine as claimed in claim 11 and in which there are further recessed hollows in the end walls, each of the said hollows in the end walls extending circumferentially along the said hollow at the said end corners, and each of the said hollows in the peripheral wall at said end corners and the said hollow in the end walls are joined to form a combined circumferential hollow.

References Cited

UNITED STATES PATENTS

| | | | |
|---|---|---|---|
| 3,136,302 | 6/1964 | Nallinger | 123—8 |
| 3,168,078 | 2/1965 | Lamm | 123—8 |

RALPH D. BLAKESLEE, *Primary Examiner.*